US011105269B2

(12) United States Patent
Moniz et al.

(10) Patent No.: US 11,105,269 B2
(45) Date of Patent: Aug. 31, 2021

(54) METHOD OF CONTROL OF THREE SPOOL GAS TURBINE ENGINE

(71) Applicant: General Electric Company, Schenectady, NY (US)

(72) Inventors: Thomas Ory Moniz, Loveland, OH (US); Alan Roy Stuart, Cincinnati, OH (US); James William Simunek, Cincinnati, OH (US); Jeffrey Donald Clements, Mason, OH (US); Brandon Wayne Miller, Liberty Township, OH (US); Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 940 days.

(21) Appl. No.: 15/593,748

(22) Filed: May 12, 2017

(65) Prior Publication Data
US 2018/0328287 A1 Nov. 15, 2018

(51) Int. Cl.
*F02C 9/48* (2006.01)
*F02C 9/20* (2006.01)
(Continued)

(52) U.S. Cl.
CPC ............... *F02C 7/36* (2013.01); *F01D 5/03* (2013.01); *F02C 7/22* (2013.01); *F02C 9/20* (2013.01);
(Continued)

(58) Field of Classification Search
CPC ............. F05D 2270/02; F05D 2270/05; F05D 2270/304; F05D 2270/053;
(Continued)

(56) References Cited

U.S. PATENT DOCUMENTS 5,694,765 A 12/1997 Hield et al.
5,797,105 A 8/1998 Nakaya et al.
(Continued)

FOREIGN PATENT DOCUMENTS

CN 101498243 A 8/2009

OTHER PUBLICATIONS

Combined Chinese Office Action and Search Report Corresponding to Application No. 201810449709 dated Apr. 26, 2020.

*Primary Examiner* — Todd E Manahan
*Assistant Examiner* — Sean V Meiller
(74) *Attorney, Agent, or Firm* — Dority & Manning, P.A.

(57) ABSTRACT

The present disclosure is directed to a method of control of a gas turbine engine comprising a fan section coupled to a low turbine together defining a low spool, an intermediate compressor coupled to an intermediate turbine together defining an intermediate spool, and a high compressor coupled to a high turbine together defining a high spool. The method includes providing an intermediate spool speed to low spool speed characteristic curve to a controller; providing a commanded power output to the controller; providing one or more of an environmental condition to the controller; determining, via the controller, a commanded fuel flow rate; determining, via the controller, a commanded intermediate compressor loading; and generating an actual power output of the engine, wherein the actual power output is one or more of an actual low spool speed, an actual intermediate spool speed, an actual high spool speed, and an actual engine pressure ratio.

18 Claims, 7 Drawing Sheets

(51) Int. Cl.
*F02C 7/36* (2006.01)
*F02C 7/22* (2006.01)
*F04D 29/56* (2006.01)
*F01D 5/03* (2006.01)
*F04D 27/00* (2006.01)
*F02C 9/28* (2006.01)
*F02C 3/067* (2006.01)

(52) U.S. Cl.
CPC .............. *F02C 9/28* (2013.01); *F04D 27/002* (2013.01); *F04D 29/563* (2013.01); *F02C 3/067* (2013.01); *F05D 2220/32* (2013.01); *F05D 2270/023* (2013.01); *F05D 2270/051* (2013.01); *F05D 2270/053* (2013.01); *F05D 2270/304* (2013.01); *F05D 2270/31* (2013.01); *F05D 2270/335* (2013.01)

(58) Field of Classification Search
CPC ......... F05D 2270/051; F05D 2270/335; F05D 2270/023; F04D 27/002; F02C 3/067; F02C 9/20; F02C 9/28; F02C 9/48; F02C 9/52
See application file for complete search history.

(56) References Cited

U.S. PATENT DOCUMENTS

| | | | |
|---|---|---|---|
| 6,346,892 B1 | 2/2002 | DeMers et al. | |
| 6,792,745 B2 | 9/2004 | Wojciechowski | |
| 6,823,675 B2 | 11/2004 | Brunell et al. | |
| 7,866,159 B2 * | 1/2011 | Bowman | F02C 9/28 60/772 |
| 8,090,456 B2 | 1/2012 | Karpman et al. | |
| 8,127,528 B2 | 3/2012 | Roberge | |
| 8,661,781 B2 | 3/2014 | Moore et al. | |
| 8,682,454 B2 | 3/2014 | Fuller et al. | |
| 8,915,700 B2 | 12/2014 | Kupratis et al. | |
| 9,051,044 B2 | 6/2015 | Talasco et al. | |
| 9,074,485 B2 | 7/2015 | Suciu et al. | |
| 9,190,892 B2 | 11/2015 | Anthony | |
| 9,279,388 B2 * | 3/2016 | Kupratis | F02C 9/22 |
| 9,481,473 B2 | 11/2016 | Skertic | |
| 9,494,085 B2 * | 11/2016 | Cai | F02C 3/10 |
| 10,060,285 B2 * | 8/2018 | Do | F02C 9/20 |
| 10,393,029 B2 * | 8/2019 | Tramontin | F02C 9/22 |
| 2005/0172610 A1 | 8/2005 | Bart et al. | |
| 2009/0193785 A1 | 8/2009 | Siden et al. | |
| 2010/0089019 A1 | 4/2010 | Knight et al. | |
| 2011/0238189 A1 | 9/2011 | Butera et al. | |
| 2014/0363276 A1 | 12/2014 | Vetters et al. | |
| 2015/0159500 A1 | 6/2015 | Carlucci et al. | |
| 2016/0040550 A1 | 2/2016 | Do et al. | |
| 2016/0281611 A1 | 9/2016 | Stockwell | |
| 2017/0058786 A1 | 3/2017 | Stockwell | |
| 2017/0211486 A1 * | 7/2017 | Rowe | F02C 9/28 |
| 2017/0298816 A1 * | 10/2017 | Razak | F16H 61/56 |

* cited by examiner

METHOD OF CONTROL OF THREE SPOOL GAS TURBINE ENGINE

FIELD

The present subject matter relates generally to gas turbine engines, and more specifically, to a method of operating a three spool gas turbine engine.

BACKGROUND

Conventional gas turbine engines generally include a fan section and a core engine in serial flow arrangement. In a three spool configuration, the fan section is mechanically coupled to a low pressure turbine; an intermediate pressure compressor is coupled to an intermediate pressure turbine; and a high pressure compressor is coupled to a high pressure turbine. Each of the low, intermediate, and high pressure spools are aerodynamically coupled such that operation of one generally affects operation of another.

For a three spool gas turbine engine including counter rotating turbines, such as an interdigitated turbine section of a gas turbine engine, it is necessary that the counter rotating turbines are turning at specific relative rotational speeds in order to improve engine operability (i.e., performance and stability at all steady-state and transient conditions), efficiency, and responsiveness.

Therefore, there is a need for a method of control and operation for a three spool gas turbine engine that improves engine operability, efficiency, and responsiveness.

BRIEF DESCRIPTION

Aspects and advantages of the invention will be set forth in part in the following description, or may be obvious from the description, or may be learned through practice of the invention.

The present disclosure is directed to a method of control of a gas turbine engine comprising a fan section coupled to a low turbine together defining a low spool, an intermediate compressor coupled to an intermediate turbine together defining an intermediate spool, and a high compressor coupled to a high turbine together defining a high spool. The method includes providing an intermediate spool speed to low spool speed characteristic curve to a controller; providing a commanded power output to the controller; providing one or more of an environmental condition to the controller; determining, via the controller, a commanded fuel flow rate; determining, via the controller, a commanded intermediate compressor loading; and generating an actual power output of the engine, wherein the actual power output is one or more of an actual low spool speed, an actual intermediate spool speed, an actual high spool speed, and an actual engine pressure ratio.

In various embodiments, the method further includes determining, via the controller, a commanded high compressor loading, wherein the commanded high compressor loading is based at least on a variable guide vane (VGV) position. In one embodiment, determining a commanded fuel flow rate, a commanded intermediate compressor loading, and a commanded high compressor loading includes determining a difference between the commanded power output and the actual power output of the engine.

In still various embodiments, the method further includes determining, via the controller, a commanded thrust output from the commanded power output and one or more of the environmental conditions. In one embodiment, the method further includes determining, via the controller, a commanded fuel flow rate from a difference in the commanded thrust output and an actual thrust output. In another embodiment, the method further includes determining, via the controller, the commanded intermediate compressor loading from the commanded intermediate spool speed and the actual intermediate spool speed. In still another embodiment, the method further includes determining, via the intermediate spool speed to low spool speed characteristic curve, a commanded intermediate spool speed based at least on the actual thrust output. In yet another embodiment, the method further includes providing to the controller an actual thrust output and an actual intermediate spool speed; and determining, via the controller, the commanded thrust output and the commanded intermediate spool speed based at least on the actual thrust output, the actual intermediate spool speed, the commanded power output, and one or more of the environmental conditions.

In one embodiment, the method further includes determining, via a variable guide vane (VGV) schedule, the high compressor loading based at least on the actual high spool speed.

In various embodiments, determining the commanded fuel flow rate and the commanded intermediate compressor loading comprises determining the commanded fuel flow rate and the commanded intermediate compressor loading from a thrust output error and an intermediate spool speed error, wherein the thrust output error is defined by a difference between the commanded thrust output and the actual thrust output, and wherein the intermediate spool speed error is defined by a difference between a commanded intermediate spool speed and the actual intermediate spool speed. In one embodiment, the method further includes providing, via the controller, a commanded high spool speed; and determining, via the controller, a commanded high compressor loading based at least on a difference in the commanded high spool speed and an actual high spool speed.

In one embodiment, the method further includes adjusting the actual power output based at least on the commanded fuel flow rate, the commanded intermediate compressor loading, and the commanded high compressor loading; and providing the actual power output of the engine to the controller.

In various embodiments, the environmental conditions includes one or more of an altitude, an air flow rate entering the engine, an ambient temperature of air outside the engine, and a temperature of air at the engine inlet.

In still various embodiments, the intermediate compressor loading includes one or more of an intermediate compressor bleed valve position and a variable stator vane (VSV) position of the intermediate compressor.

In still other various embodiments, the commanded power output is based on one or more of a commanded low spool speed and commanded engine pressure ratio, and wherein the actual power output is based on one or more of an actual low spool speed and an actual engine pressure ratio.

In still yet other various embodiments, the commanded power output is based at least on a throttle lever position.

The present disclosure is further directed to a gas turbine engine comprising a low spool speed sensor, an intermediate spool speed sensor, a high spool speed sensor, a variable stator vane positioning sensor measuring a positioning of one or more variable stator vanes (VSV) of an intermediate compressor, a bleed valve positioning sensor measuring a bleed valve position of an intermediate compressor, and a variable guide vane sensor measuring a position of variable guide vanes (VGV) of a high compressor, and a controller configured to execute instructions. The instructions include receiving a commanded power output of the engine and one or more environmental conditions; determining a difference between the commanded power output and an actual power output; determining a difference between a commanded intermediate spool speed and an actual intermediate spool speed; determining a commanded fuel flow rate and an intermediate compressor loading via one or more of a VSV position and a bleed valve position; and monitoring an actual power output of the engine, wherein monitoring the actual power output includes receiving one or more of low spool speed, an intermediate spool speed, a high spool speed, and an engine pressure ratio.

In one embodiment, the controller is configured to execute instructions further including determining a commanded intermediate spool speed based at least on the actual intermediate spool speed and the actual thrust output via an intermediate spool speed to low spool speed characteristic curve.

In one embodiment, the controller is configured to execute instructions further including determining, via a VGV schedule, a commanded high compressor loading, wherein the high compressor loading includes a VGV position.

In another embodiment, the controller is configured to execute instructions further including receiving an actual high spool speed; and determining a commanded high spool speed based at least on an actual high spool speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
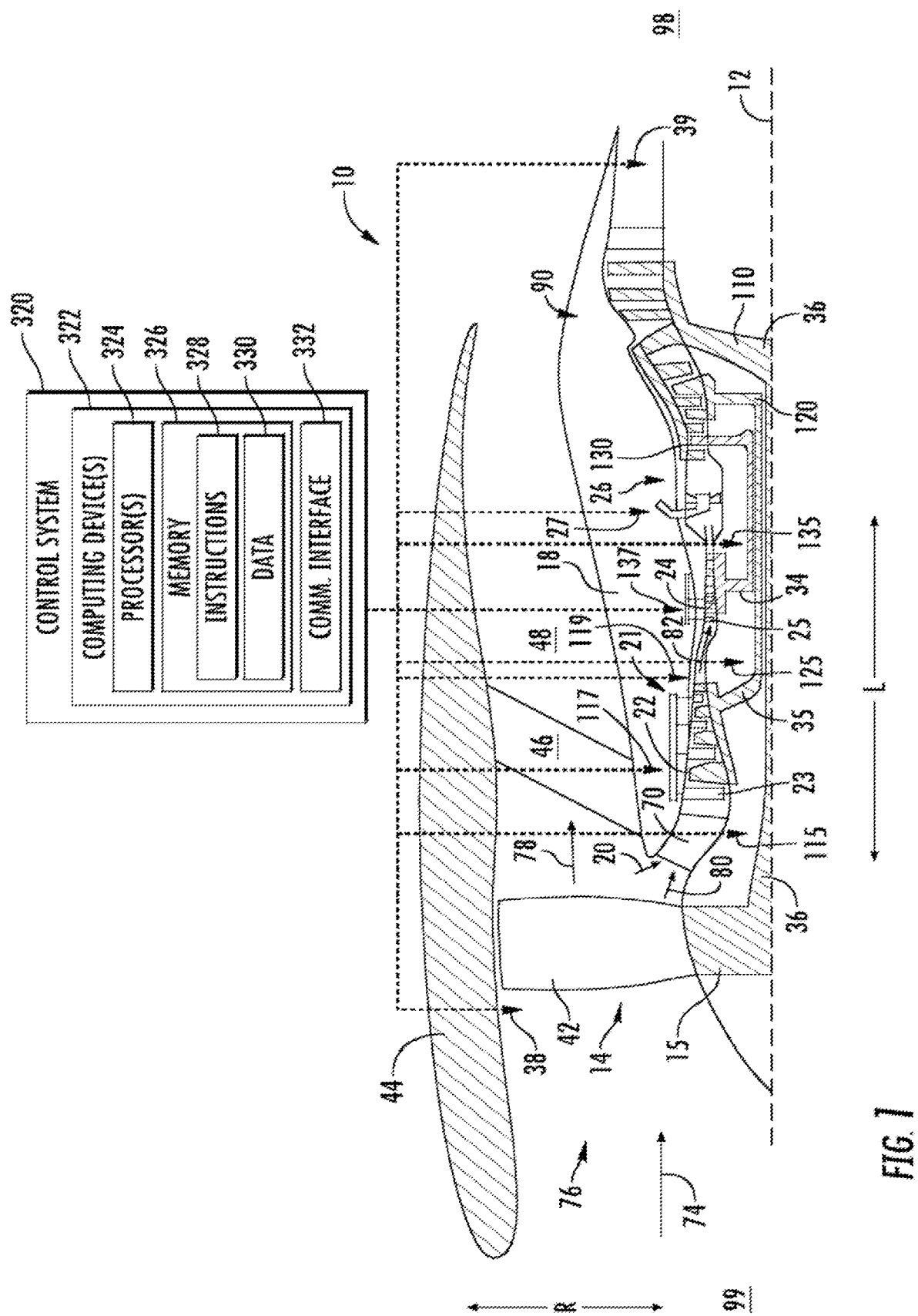
FIG. 1 is a schematic cross sectional view of an exemplary three spool interdigitated gas turbine engine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low", "intermediate", "high", or their respective comparative degrees (e.g. -er, where applicable) each refer to relative speeds within an engine unless otherwise specified. For example, a "low turbine" or "low speed turbine" defines a rotational speed lower than a "high turbine" or "high speed turbine". Alternatively, unless otherwise specified, the aforementioned terms may be understood in their superlative degree. For example, a "low turbine" may refer to the lowest rotational speed turbine within a turbine section, and a "high turbine" may refer to the highest rotational speed turbine within the turbine section.

A three spool gas turbine engine and method of control is generally provided that may enable a desired operation of the engine, such as generally providing operability, stability, and performance across a range of engine conditions and modes of operation. The engine and method of control generally provided herein may further enable an operation of an interdigitated counter rotating turbine engine that may control a rotational speed of an intermediate speed turbine, a high speed turbine, or both relative to a low speed turbine interdigitated among one or both of the intermediate and high speed turbine rotors. The engine and methods generally provided herein may prevent under-speed, over-speed, or general speed mismatch among the low speed spool, the intermediate speed spool, and the high speed spool.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet 20. The outer casing 18 encases or at least partially flows, in serial flow arrangement, a compressor section 21, a combustion section 26, and an interdigitated turbine section 90 (herein referred to as "turbine section 90"). Generally, the engine 10 defines, in serial flow arrangement from the upstream end 99 to the downstream end 98, the fan assembly 14, the compressor section 21, the combustion section 26, and the turbine section 90. In the embodiment shown in FIG. 1, the compressor section 21 defines a high pressure compressor (HPC) 24 and an intermediate pressure compressor (IPC) 22. In other embodiments, the fan assembly 14 may further include or define one or more stages of a plurality of fan blades 42 that are coupled to and extend outwardly in the radial direction R from a fan rotor 15 and/or a low speed shaft 36. In various embodiments, multiple stages of the plurality of fan blades 42 coupled to the low speed shaft 36 may be referred to as a low pressure compressor (LPC).

In various embodiments, the turbine section 90 includes a low turbine 110, an intermediate turbine 120, and a high turbine 130, in which the low turbine 110 is interdigitated among the intermediate turbine 120 (i.e., alternating rows or stages of the low turbine 110 and the intermediate turbine 120 along the longitudinal direction L). In one embodiment, such as shown in FIG. 1, the low turbine 110 is further interdigitated among high turbine 130 and the intermediate turbine 120.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

During operation of the engine 10 as shown collectively in FIG. 1, the high turbine 130 rotates generally at a higher rotational speed than the intermediate speed turbine rotor 120. The intermediate turbine 120 rotates generally at a higher speed than the low turbine 110. During operation of the engine 10, a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed or through the fan assembly 14 into a core flowpath 70 defined through the compressor section 21, the combustion section 26, and the turbine section 90 of the engine 10. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Referring still to FIG. 1, the engine 10 may further include an inlet pressure sensor 138 disposed forward or upstream of the fan blades 42 and an exit pressure sensor 139 disposed aft or downstream of the turbine section 90. The sensors 138, 139 may each monitor and measure a pressure at their respective locations, each of which may together be used to calculate an engine pressure ratio (EPR) of the engine 10. The EPR may be utilized to provide an actual thrust output measurement of the engine 10 used to monitor, measure, and control an operation of the engine.

In various embodiments, the low turbine 110 and the fan assembly 14, each of which are coupled to a low speed shaft 36, rotates in a first direction along a circumferential direction. The fan assembly 14, the low speed shaft 36, and the low turbine 110 are collectively referred to as a low spool. The high turbine 130 and the HPC 24, each of which are coupled to a high speed shaft 34, rotate in a second direction opposite of the first direction along the circumferential direction. The HPC 24, the high speed shaft 34, and the high turbine 130 are collectively referred to as a high spool. The intermediate turbine 120 and the IPC 22, each of which are coupled to an intermediate speed shaft 35, rotate in the second direction in co-rotation with the high turbine 130 and in counter-rotation with the low turbine 110. The IPC 22, the intermediate speed shaft 35, and the intermediate turbine 120 are collectively referred to as an intermediate spool. Although further described herein as a counter-rotating turbine engine, in which the low turbine 110 rotates in a direction opposite of the high turbine 130 and/or intermediate turbine 120, it should be understood that the engine 10 may be configured as a co-rotating engine, in which the low turbine 110, the high turbine 130, and the intermediate turbine 120 each rotate in the first direction.

It should further be understood that the first direction and the second direction as used and described herein are intended to denote directions relative to one another. Therefore, the first direction may refer to a clockwise rotation (viewed from downstream end 98 looking toward the upstream end 99) and the second direction may refer to a counter-clockwise rotation (viewed from downstream end 98 looking toward the upstream end 99). Alternatively, the first direction may refer to a counter-clockwise rotation (viewed from downstream end 98 looking toward the upstream end 99) and the second direction may refer to a clockwise rotation (viewed from downstream end 98 looking toward the upstream end 99).

Still further during an operation of the engine 10, combustion gases 86 exiting the combustion section 26 define a generally low speed toward the downstream end 98 of the engine 10. A low speed rotation (e.g. along a tangential or circumferential direction) of the first stage of the low turbine 110 accelerates a speed of the combustion gases 86, such as in the tangential or circumferential direction to approximately equal or greater than a speed of the high turbine 130.

Referring still to FIG. 1, the engine 10 generally includes several speed sensors to measure and monitor a rotational speed of the spools. In the embodiment generally provided, the engine 10 includes a low spool speed sensor 115 proximate to the low spool to measure the rotational speed of the low spool. The engine 10 further includes an intermediate spool speed sensor 125 proximate to the intermediate spool to measure the rotational speed of the intermediate spool. The engine 10 still further includes a high spool speed sensor 135 proximate to the high spool to measure the rotational speed of the high spool.

Still further, the IPC 22 of the engine 10 includes one or more rows or stages or variable stator vanes (VSVs) 23 disposed among rotating rows or stages of the IPC 22. One or more rows of the VSVs 23 are rotatable about an axis of each vane such as to change an angle of incidence of the vane relative to the air 80 flowing through the IPC 22 along the longitudinal direction L. Adjusting the angle of incidence of the VSVs 23 increases or decreases a flow rate of the air 80 passing through the IPC 22, thereby increasing or decreasing the rotational speed of the IPC 22 and the intermediate spool generally.

An angle of the VSVs 23 is measured by a VSV sensor 117. In various embodiments, the VSV sensor 117 measures a displacement of the VSVs 23 from one position to another. For example, the VSV sensor 117 may be a linear variable displacement transducer (LVDT) coupled to an actuator displacing one or more rows or stages of the VSVs 23. The VSV sensor 117 may measure an amount of displacement of the actuator and relate a linear change to a rotational change of each vane of the VSVs 23. As another non-limiting example, the VSV sensor 117 may be a rotary variable differential transducer (RVDT) that measures an amount of rotational displacement or change of each vane of the VSVs 23.

The IPC 22 may further include one or more bleed valves to which a bleed valve positioning sensor 119 is coupled to read an amount by which the bleed valve is open or closed. The bleed valve may generally allow a portion of air 80 to exit the IPC 22 or the core flowpath 70 generally, thereby reducing an amount of compressed air 82 flowing through the IPC 22 and/or the HPC 24. Adjusting the bleed valve position, such as to reduce an amount of compressed air 82 flowing through the core flowpath 70, may enable adjusting a rotational speed of the IPC 22, the HPC 24, or both.

Referring still to FIG. 1, the engine 10 further includes one or more rows or stages of variable guide vanes (VGVs) 25 disposed between rotating stages of the HPC 24. An angle of the VGVs 25 is measured by a VGV sensor 137. In various embodiments, the VGV sensor 137 measures a displacement of the VGVs 25 from one position to another. For example, the VGV sensor 137 may be a linear variable displacement transducer (LVDT) coupled to an actuator configured to displace one or more rows or stages of the VGVs 25. The VGV sensor 137 may measure an amount of displacement of the actuator and relate a linear change to a rotational change of each vane of the VGVs 25. As another non-limiting example, the VGV sensor 137 may be a rotary variable differential transducer (RVDT) that measures an amount of rotational displacement or change of each vane of the VGVs 25. Adjusting an angle of incidence of the VGVs 25 increases or decreases a flow rate or mass of the air 82 passing through the HPC 24, thereby increasing or decreasing the rotational speed of the HPC 24 and the high spool generally.

The engine 10 further includes one or more fuel flow sensors 27 configured to calculate or measure a flow rate (e.g., a mass flow rate, volumetric flow rate, etc.) of fuel entering the combustion section 26 for combustion to form the combustion gases 86 driving the turbine section 90. The fuel flow sensor 27 generally calculates or measures and monitors the fuel flow into the combustion section 26, in which the engine 10 may adjust the amount of fuel used for combustion to increase or decrease the rotational speed of the rotary members of the turbine section 90. In various embodiments, the fuel flow sensor 27 may measure a valve position (e.g., an amount of open or close of a valve permitting a fuel flow), and the valve position may infer an amount of fuel entering the combustion section 26. For example, the fuel flow sensor 27 may calculate the fuel flow as a function of valve position and one or more other parameters, such as temperature, pressure, or other physical properties of the fuel. As such, adjusting the flow rate of fuel may at least partially adjust the rotational speed of at least one of the low spool, the intermediate spool, and the high spool.

Referring still to FIG. 1, engine 10 further includes a controller 320. As shown, the controller 320 can include one or more computing device(s) 322. The computing device(s) 322 may be configured to execute one or more methods in accordance with exemplary aspects of the present disclosure (such as method described below with reference to FIG. 3). The computing device(s) 322 can include one or more processor(s) 324 and one or more memory device(s) 326. The one or more processor(s) 324 can include any suitable processing device, such as a microprocessor, microcontroller, integrated circuit, logic device, or other suitable processing device. The one or more memory device(s) 326 can include one or more computer-readable media, including, but not limited to, non-transitory computer-readable media, RAM, ROM, hard drives, flash drives, or other memory devices.

The one or more memory device(s) 326 can store information accessible by the one or more processor(s) 324, including computer-readable instructions 328 that can be executed by the one or more processor(s) 324. The instructions 328 can be any set of instructions that when executed by the one or more processor(s) 324, cause the one or more processor(s) 324 to perform operations. The instructions 328 can be software written in any suitable programming language or can be implemented in hardware. In some embodiments, the instructions 328 can be executed by the one or more processor(s) 324 to cause the one or more processor(s) 324 to perform operations, such as the operations for regulating fuel flow, as described herein, and/or any other operations or functions of the one or more computing device(s) 322. Additionally, and/or alternatively, the instructions 328 can be executed in logically and/or virtually separate threads on processor 324. The memory device(s) 326 can further store data 330 that can be accessed by the processors 324.

The computing device(s) 322 can also include a communications interface 332 used to communicate, for example, with the other components of engine 10. The communications interface 332 can include any suitable components for interfacing with one more communications network(s), including for example, transmitters, receivers, ports, controllers, antennas, or other suitable components. Controller 320 may also be communication (e.g., via communications interface 332) with the various sensors, such as sensors 27, 115, 117, 119, 125, 135, 137, 138, 139 described above, and may selectively operating engine 10 in response to user input and feedback from these sensors.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel. In various embodiments, the computer-based systems may include one or more of, or a combination of, a full authority digital engine controller (FADEC), an electronic engine controller (EEC), an engine control unit (ECU), a power module, one or more sensors, actuators, transducers, or combinations thereof that may monitor, control, adjust, or otherwise manipulate a fluid flow within the engine 10 or a position of one or more rows or stages of airfoils.

Figure 2:
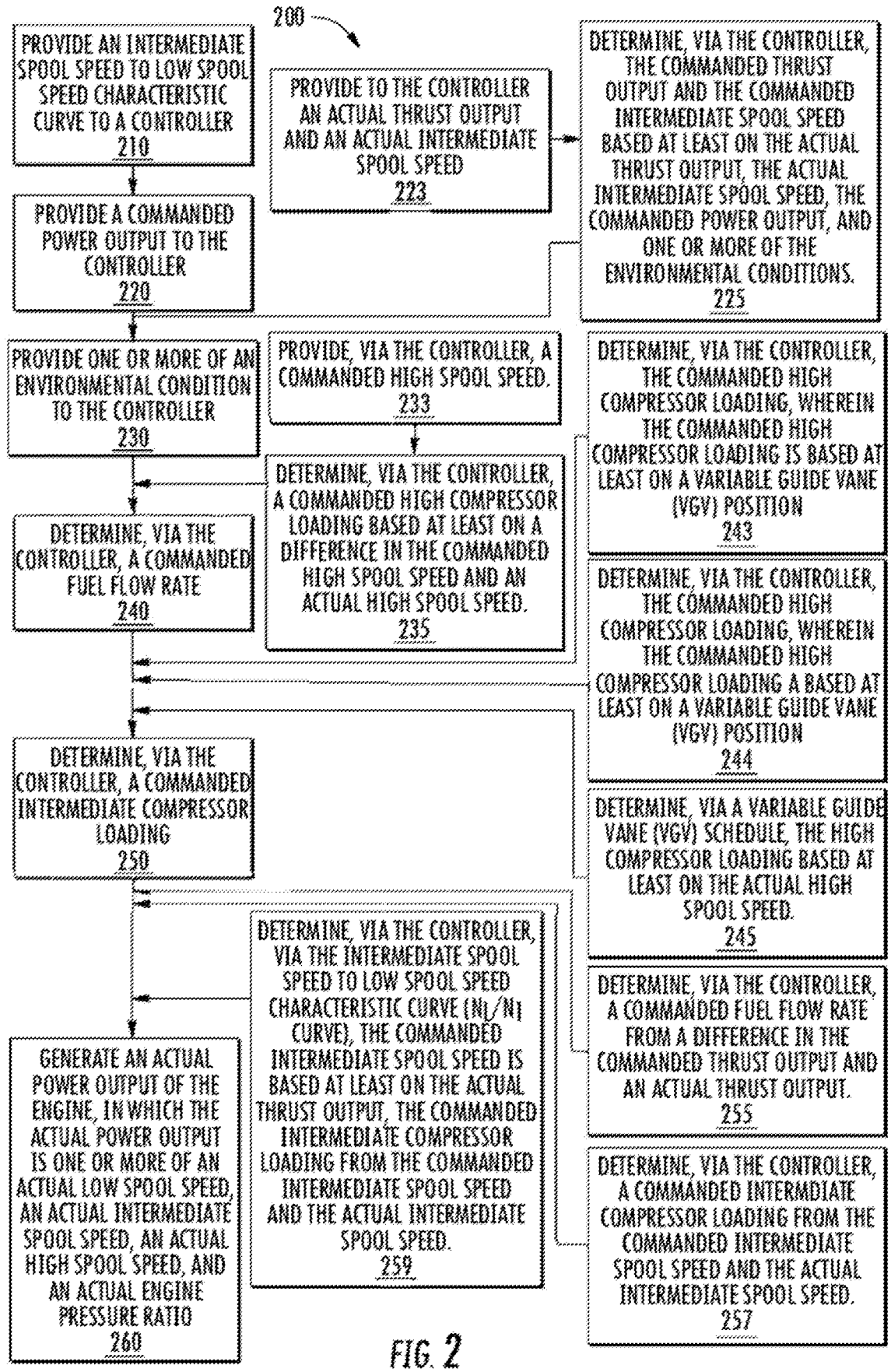
FIG. 2 is an exemplary flow chart outlining steps of a method of controlling a three spool gas turbine engine such as generally provided in FIG. 1.

Referring now to FIG. 2, an exemplary flowchart outlining a method of control of a three spool gas turbine engine is generally provided (hereinafter referred to as "method 200"). The engine includes a fan section coupled to a low turbine together defining a low spool, an intermediate compressor coupled to an intermediate turbine together defining an intermediate spool, and a high compressor coupled to a high turbine together defining a high spool. The method 200 may be implemented with an engine configured substantially similarly to the engine 10 shown and described in regard to FIG. 1.

In various embodiments, the method 200 includes at 210 providing an intermediate spool speed to low spool speed characteristic curve to a controller; at 220 providing a commanded power output to the controller; at 230 providing one or more of an environmental condition to the controller; at 240 determining, via the controller, a commanded fuel flow rate; at 250 determining, via the controller, a commanded intermediate compressor loading; and at 260 generating an actual power output of the engine, in which the actual power output is one or more of an actual low spool speed, an actual intermediate spool speed, an actual high spool speed, and an actual engine pressure ratio (EPR).

In various embodiments of the method 200, the environmental conditions include one or more of an altitude, an air flow rate entering the engine, an ambient temperature of air outside the engine, and a temperature of air at the engine inlet. For example, referring back to FIG. 1, the ambient temperature of air outside of the engine 10 may include a temperature of air 74 entering the inlet 76 of the nacelle 44. As another example, the ambient temperature of air at the engine inlet may include a temperature of air 80 at the annular inlet 20 to the core flowpath 70 generally upstream of the IPC 22. As yet another example, the air flow rate entering the engine 10 may include a mass flow rate or volumetric flow rate of the air 74 or the air 80 entering the annular inlet 20 to the core flowpath 70 of the engine 10. The air flow rate may be represented as a Mach number.

In one embodiment of the method 200, the commanded power output is based at least on a throttle lever position or angle or equivalent as may generally be used by an engine operator (e.g., a pilot) to request or command a thrust output or mode of operation of the engine 10. The throttle lever position input to the controller (e.g., a power module) may correlate the throttle lever position or angle to a target thrust output or engine operation condition, such as via a schedule or look-up table.

In various embodiments, the method 200 further includes at 245 determining, via the controller, a commanded thrust output from the commanded power output and one or more of the environmental conditions. The commanded thrust output is based on one or more of a commanded low spool speed, a commanded engine pressure ratio, or both. Still further, the actual thrust output is based on one or more of the actual low spool speed of the engine 10, the actual engine pressure ratio of the engine 10, or both. For example, the actual low spool speed may include a mechanical speed (e.g., a rotational speed of the low shaft 34) or a corrected mechanical speed based on a combination of a rotational speed of the low spool and one or more of a temperature, pressure, density, and flow rate of fluid across the low spool (e.g., across the fan blades 42). As another example, the engine pressure ratio (EPR) may be defined by a ratio including a total pressure of fluid upstream of and proximate to the fan blades 42 over a total pressure of fluid downstream of the turbine section 90 (e.g., downstream of the exhaust nozzle).

In one embodiment, the intermediate spool speed to low spool speed characteristic curve defines a schedule, look-up table, or transfer function correlating one or more intermediate spool speeds to one or more low spool speeds. The intermediate spool speed to low spool speed characteristic curve may define a desired or optimal rotational speed of the intermediate spool relative to the rotational speed of the low spool. The desired or optimal relationship of the intermediate spool speed relative to the low spool speed may provide one or more inputs in determining a fuel flow rate, a VGV position, a VSV position, or a bleed valve position, or changes thereof, for the engine 10.

Referring still to FIGS. 1-2, intermediate compressor loading in the method 200 may include one or more of an intermediate compressor bleed valve position (e.g., from the bleed valve position sensor 119) and a variable stator vane (VSV) position (e.g., from the VSV position sensor 117). In various embodiments, high compressor loading in the method 200 may include a variable guide vane (VGV) position, such as determined and adjusted based at least on the VGV position sensor 137.

Referring now to FIGS. 3-7, various exemplary embodiments of control schematics incorporating the method 200 are generally provided. The control schematics generally provided in FIGS. 3-7 may be implemented in conjunction with the engine 10 and controllers 220 generally provided in FIG. 1.

Figure 3:
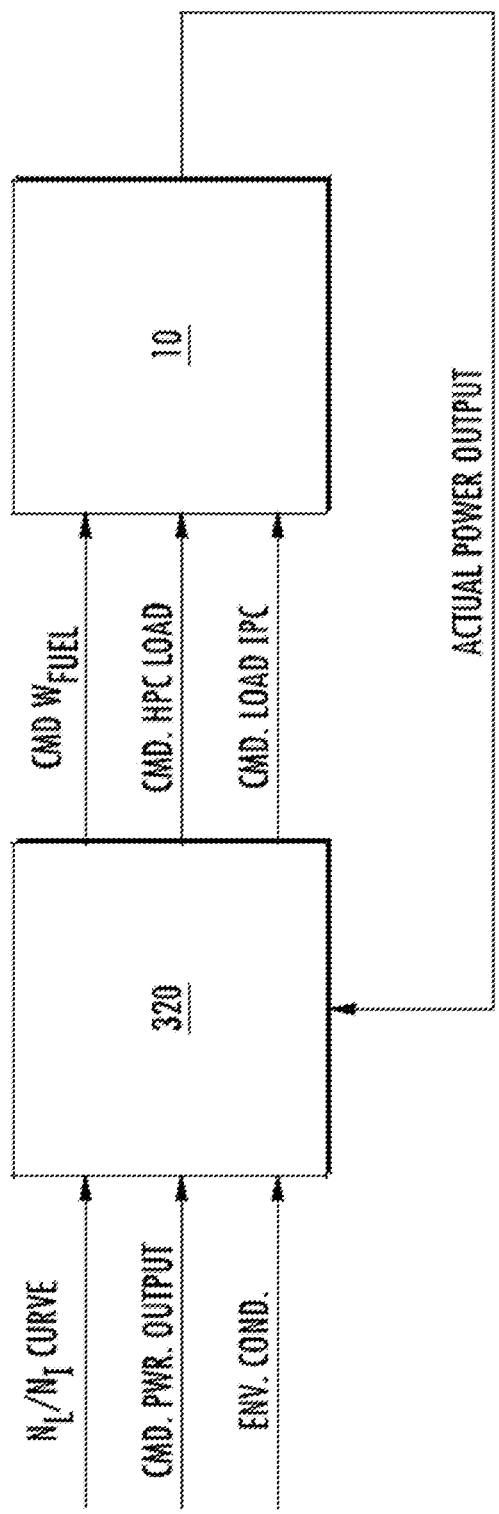
FIG. 3 is an exemplary schematic control chart for controlling a gas turbine engine such as generally provided in FIG. 1.

Referring to exemplary embodiment shown in FIG. 3 in conjunction with the method 200 generally provided in FIG. 2, the intermediate spool speed to low spool speed characteristic curve (shown as the $N_L/N_I$ curve) the commanded power output (shown as cmd. pwr. output), and one or more of the environmental conditions (shown as env. cond.) are each provided to the controller 320 as inputs in which the controller 320 outputs a commanded fuel flow rate (shown as cmd $W_{fuel}$) and a commanded IPC loading (shown as cmd IPC load). The controller 320 communicates to the engine 10 the commanded fuel flow rate and the commanded IPC loading (e.g., the VSV position, the bleed position, or both) based at least on the commanded power output, the one or more environmental conditions, and the actual power output of the engine. The engine 10 executes the commanded fuel flow rate and the commanded IPC loading to produce an actual power output that may include one or more of an actual thrust output, an actual intermediate spool speed ($N_I$), and an actual high spool speed ($N_H$). The actual power output is generally monitored and measured by one or more sensors (e.g., speed sensors 115, 125, 135, and pressure sensors 138, 139) and communicated to the controller 320 as sensor feedback from the engine 10. In the embodiment shown in FIG. 3, the actual power output may further include measurements from one or more sensors such as the VSV position sensor 117, the bleed valve position sensor 119, and the VGV position sensor 137 as generally provided in FIG. 1.

In various embodiments, the controller 320 defines a single-input/single-output (SISO) controller, a multiple-input/multiple-output (MIMO) controller, or a schedule or look-up table based on at least the inputs into the controller 320, or one or more transfer functions.

Referring to FIG. 2, the method 200 may further include at 243 determining, via the controller, a commanded high compressor loading, wherein the commanded high compressor loading is based at least on a variable guide vane (VGV)

position. For example, in reference to FIGS. 3-7, the controller 320 may further output to the engine 10 a commanded HPC loading based on a VGV position, an upstream HPC pressure (e.g., between the IPC 22 and the HPC 24 in FIG. 1), and a downstream HPC pressure (e.g., within the combustion section 26 and upstream of a combustion chamber).

Figure 4:
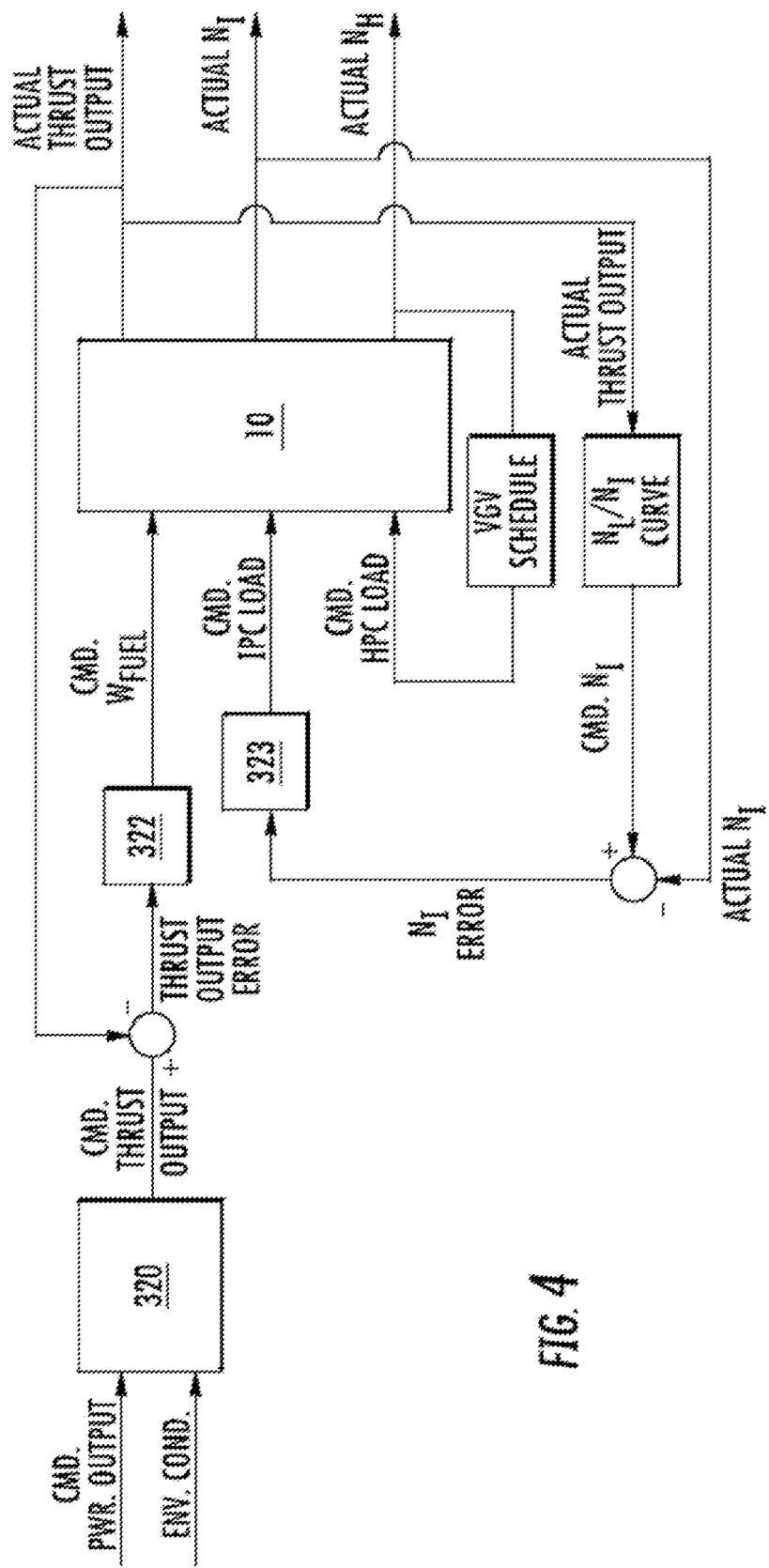
FIG. 4 is another exemplary schematic control chart for controlling a gas turbine engine such as generally provided in FIG. 1.

Referring now to FIG. 4 in conjunction with method 200 of FIG. 2, the control schematic may be configured substantially similarly as shown and described in regard to FIG. 3. The controller 320 of FIG. 3 may further include several controllers as shown schematically as 321, 322, 323, and 324 in FIGS. 3-7. In various embodiments of the method 200 such as shown in FIG. 4, determining a commanded fuel flow rate, a commanded intermediate compressor loading, and a commanded high compressor loading at 240 may further include determining a difference between the commanded power output and the actual power output of the engine. For example, as shown in FIG. 4, a thrust output error is provided to the controller 322 based at least on a difference of the actual thrust output from the engine 10 and a commanded thrust output from the controller 321.

Referring still to FIG. 4 in conjunction with method 200 of FIG. 2, the method 200 may further include at 255 determining, via the controller, a commanded fuel flow rate from a difference in the commanded thrust output and an actual thrust output. Referring to FIG. 4, the difference between the actual thrust output and the commanded thrust output from the controller 321 may result in a thrust output error, such as a difference in commanded and actual low spool speeds $N_L$ or engine pressure ratios, etc.

The method 200 of FIG. 2 may further include at 257 determining, via the controller, the commanded intermediate compressor loading from the commanded intermediate spool speed and the actual intermediate spool speed. For example, in reference to FIG. 4, the controller 323 may determine the commanded intermediate compressor loading from an intermediate spool speed error based on a difference between a commanded intermediate spool speed and an actual intermediate spool speed. In one embodiment, the method 200 further includes at 259 determining, via the intermediate spool speed to low spool speed characteristic curve ($N_L/N_I$ curve), the commanded intermediate spool speed is based at least on the actual thrust output. In various embodiments, determining the commanded intermediate spool speed is based at least on the actual thrust output, in which the actual thrust output is the actual low spool speed. For example, the commanded intermediate spool speed may be based on the actual thrust output as the actual low spool speed in conjunction with the intermediate spool speed to low spool speed characteristic curve ($N_L/N_I$ curve).

In still various embodiments, the method 200 at 244 may include determining, via a variable guide vane (VGV) schedule, the high compressor loading based at least on the actual high spool speed, such as shown in regard to FIG. 4.

Figure 5:
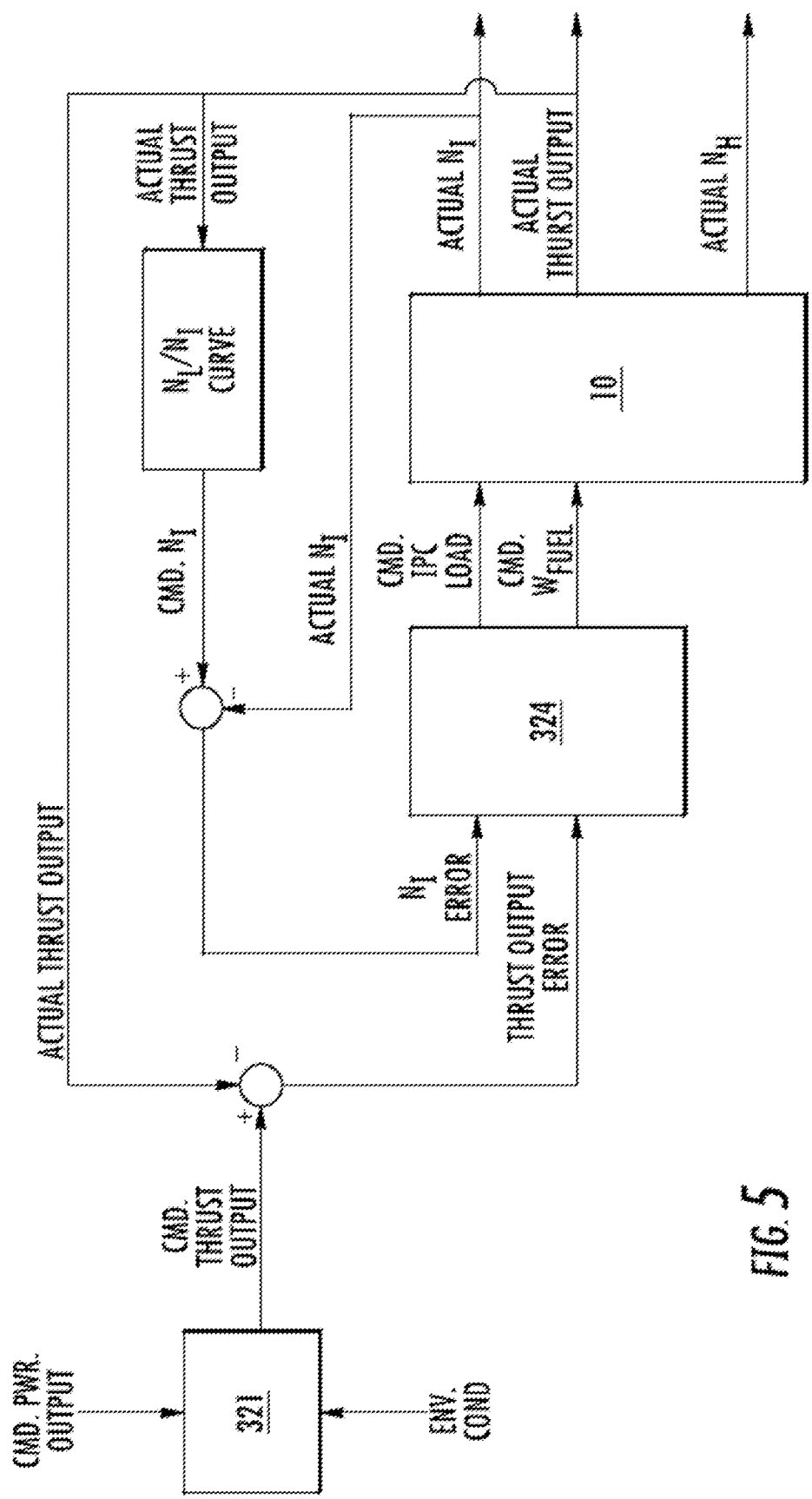
FIG. 5 is yet another exemplary schematic control chart for controlling a gas turbine engine such as generally provided in FIG. 1.

Referring to FIG. 4, controllers 322, 323 may each be configured as SISO controllers. Referring now to FIG. 5, the control schematic generally provided may be configured substantially similarly as described in regard to FIGS. 3-4. In FIG. 5, the controller 324 may be configured as a MIMO controller, in which determining the commanded fuel flow rate and the commanded intermediate compressor loading includes determining the commanded fuel flow rate and the commanded intermediate compressor loading from a thrust output error and an intermediate spool speed error. The thrust output error is defined by a difference between the commanded thrust output and the actual thrust output, and the intermediate spool speed error is defined by a difference between a commanded intermediate spool speed and the actual intermediate spool speed.

Figure 6:
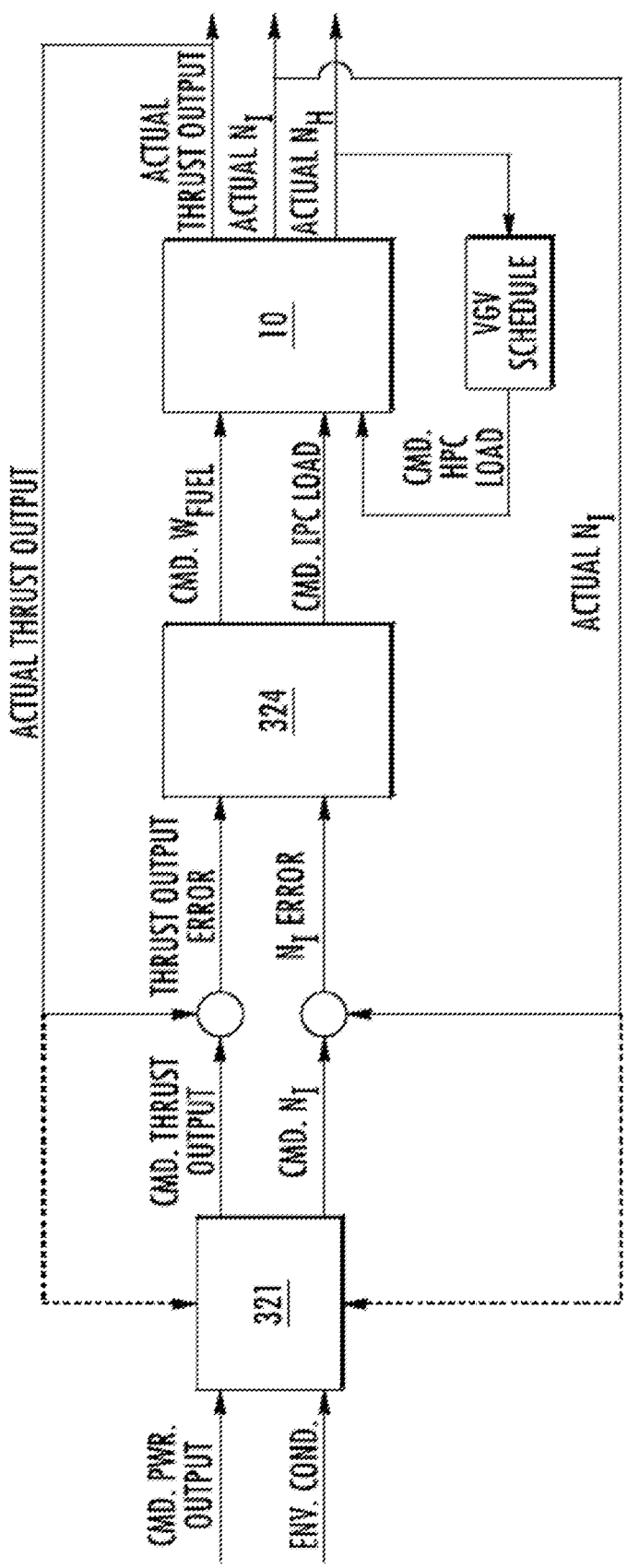
FIG. 6 is still another exemplary schematic control chart for controlling a gas turbine engine such as generally provided in FIG. 1.
Figure 7:
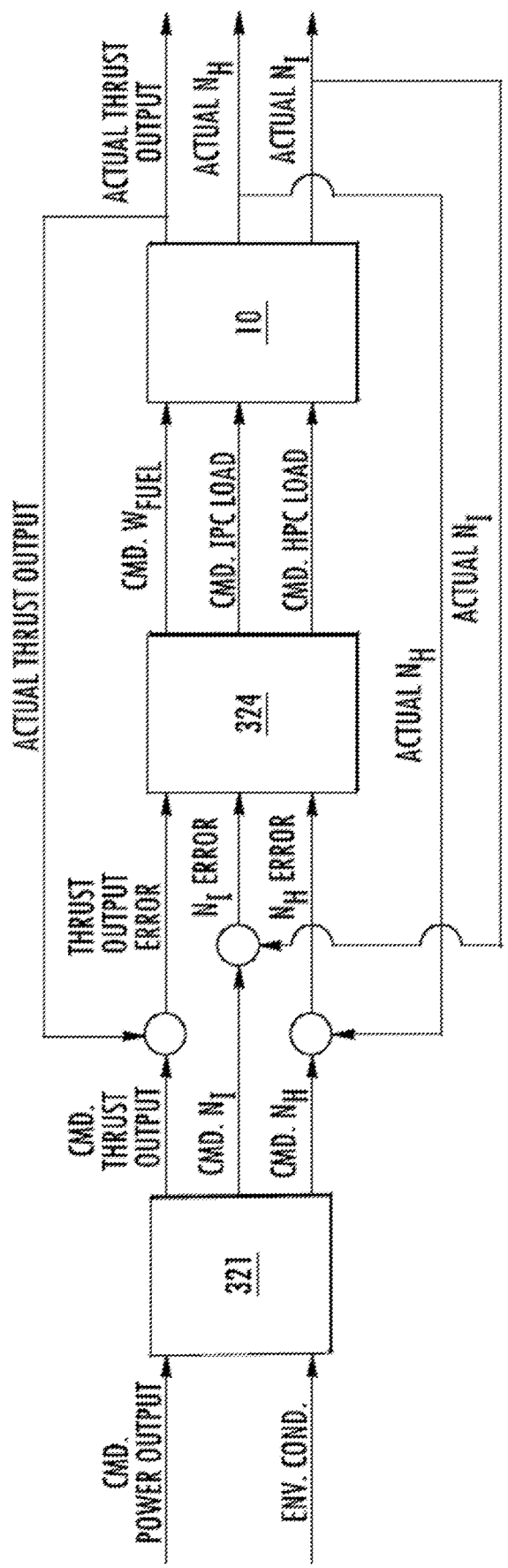
FIG. 7 is still yet another exemplary schematic control chart for controlling a gas turbine engine such as generally provided in FIG. 1.

Referring now to FIG. 6, the control schematic generally provided may be configured substantially similarly as described in regard to FIGS. 3-5. The method 200 of FIG. 2 may further include at 223 providing to the controller an actual thrust output and an actual intermediate spool speed; and at 225 determining, via the controller, the commanded thrust output and the commanded intermediate spool speed based at least on the actual thrust output, the actual intermediate spool speed, the commanded power output, and one or more of the environmental conditions. For example, as generally provided in FIG. 6, the actual intermediate spool speed and the actual thrust output may each be provided to the controller 321 as inputs along with the commanded power output and the one or more environmental conditions to output the commanded thrust output and the commanded intermediate spool speed. In various embodiments, the controller 321, such as defining a power module of the engine 10, may use the actual thrust output, the actual intermediate spool speed, or both, as inputs to enable a failsafe operation, such as by calculating an integral or derivative to determine a safe mode of operation, or change thereof, of the engine 10. In still various embodiments, the controller 321 may use the actual thrust output, the actual intermediate spool speed, or both, as inputs to modify the commanded thrust output based on the anticipated results of the inputs. For example, using the actual thrust output, the actual intermediate spool speed, or both, as inputs may improve engine operability, including surge protection, rotor overspeed protection, lean-blow out, or adverse conditions generally attributable to overspeed or over-acceleration/deceleration.

The method 200 of FIG. 2 may further include at 233 providing, via the controller, a commanded high spool speed; and at 235 determining, via the controller, a commanded high compressor loading based at least on a difference in the commanded high spool speed and an actual high spool speed. For example, in FIG. 7 a difference between the actual high spool speed $N_H$ and the commanded high spool speed $N_H$ may result in a high spool speed error input to the controller 324. In various embodiments, the commanded high spool speed may be defined by a look-up table, a schedule, or transfer function based at least on a VGV schedule relative to one or more of an actual thrust output, actual high spool speed, and commanded high spool speed.

The various embodiments of the engine 10 and method 200 may enable a desired operation of a three spool gas turbine engine such as the engine 10 described in regard to FIGS. 1-7. In one embodiment, the method 200 may enable an operation of an interdigitated counter rotating turbine engine that may desirably control a rotational speed of the intermediate turbine 120, the high turbine 130, or both, relative to the low turbine 110 interdigitated among one or both turbine rotors 120, 130. For example, the method 200 may enable stable operation and performance of the interdigitated turbine section 90 that may prevent over-speed or under-speed of the low turbine 110 relative to the intermediate turbine 120, the high turbine 130, or both.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of control of a gas turbine engine comprising a fan section coupled to a low turbine together defining a low spool, an intermediate compressor coupled to an intermediate turbine together defining an intermediate spool, and a high compressor coupled to a high turbine together defining a high spool, the method comprising:
    providing an intermediate spool speed to low spool speed characteristic curve to a controller;
    determining, via the intermediate spool speed to low spool speed characteristic curve, a commanded intermediate spool speed based at least on an actual thrust output;
    providing a commanded power output to the controller;
    providing one or more of an environmental condition to the controller;
    determining a commanded fuel flow rate;
    determining a commanded intermediate compressor loading; and
    generating an actual power output of the engine, wherein the actual power output is one or more of an actual low spool speed, an actual intermediate spool speed, an actual high spool speed, and an actual engine pressure ratio.

2. The method of claim 1, the method further comprising: determining, via the controller, a commanded high compressor loading, wherein the commanded high compressor loading is based at least on a variable guide vane (VGV) position.

3. The method of claim 2, wherein determining a commanded fuel flow rate, a commanded intermediate compressor loading, and a commanded high compressor loading includes determining a difference between the commanded power output and the actual power output of the engine.

4. The method of claim 1, the method further comprising: determining, via the controller, a commanded thrust output from the commanded power output and one or more of the environmental conditions.

5. The method of claim 4, the method further comprising: determining, via the controller, a commanded fuel flow rate from a difference in the commanded thrust output and the actual thrust output.

6. The method of claim 5, the method further comprising: determining, via the controller, the commanded intermediate compressor loading from the commanded intermediate spool speed and the actual intermediate spool speed.

7. The method of claim 4, the method further comprising: providing to the controller the actual thrust output and an actual intermediate spool speed; and determining; via the controller, the commanded thrust output and the commanded intermediate spool speed based at least on the actual thrust output, the actual intermediate spool speed, the commanded power output, and one or more of the environmental conditions.

8. The method of claim 1, the method further comprising: determining, via a variable guide vane (VGV) schedule, the high compressor loading based at least on the actual high spool speed.

9. The method of claim 1, wherein determining the commanded fuel flow rate and the commanded intermediate compressor loading comprises determining the commanded fuel flow rate and the commanded intermediate compressor loading from a thrust output error and an intermediate spool speed error, wherein the thrust output error is defined by a difference between the commanded thrust output and the actual thrust output, and wherein the intermediate spool speed error is defined by a difference between a commanded intermediate spool speed and the actual intermediate spool speed.

10. The method of claim 9, the method further comprising:
    providing, via the controller, a commanded high spool speed; and
    determining, via the controller, a commanded high compressor loading based at least on a difference in the commanded high spool speed and an actual high spool speed.

11. The method of claim 1, the method further comprising:
    adjusting the actual power output based at least on the commanded fuel flow rate, the commanded intermediate compressor loading, and the commanded high compressor loading; and
    providing the actual power output of the engine to the controller.

12. The method of claim 1, wherein the environmental conditions include one or more of an altitude, an air flow rate entering the engine, an ambient temperature of air outside the engine, and a temperature of air at the engine inlet.

13. The method of claim 1, wherein the intermediate compressor loading includes one or more of an intermediate compressor bleed valve position and a variable stator vane (VSV) position of the intermediate compressor.

14. The method of claim 1, wherein the commanded power output is based on one or more of a commanded low spool speed and commanded engine pressure ratio, and wherein the actual power output is based on one or more of an actual low spool speed and an actual engine pressure ratio.

15. The method of claim 1, wherein the commanded power output is based at least on a throttle lever position.

16. A gas turbine engine comprising a low spool speed sensor, an intermediate spool speed sensor, a high spool speed sensor, a variable stator vane positioning sensor measuring a positioning of one or more variable stator vanes (VSV) of an intermediate compressor, a bleed valve positioning sensor measuring a bleed valve position of an intermediate compressor, and a variable guide vane sensor measuring a position of variable guide vanes (VGV) of a high compressor, and a controller configured to execute instructions, the instructions comprising:
    receiving a commanded power output of the engine and one or more environmental conditions;
    determining a difference between the commanded power output and an actual power output;
    determining a difference between a commanded intermediate spool speed and an actual intermediate spool speed;
    determining a commanded fuel flow rate and an intermediate compressor loading via one or more of a VSV position and a bleed valve position;
    generating and monitoring an actual power output of the engine, wherein the actual power output is one or more of an actual thrust output, an actual low spool speed, an actual intermediate spool speed, an actual high spool speed, and an actual engine pressure ratio; and
    determining, via an intermediate spool speed to low spool speed characteristic curve, the commanded intermediate spool speed based at least on the actual intermediate spool speed and the actual thrust output.

17. The gas turbine engine of claim 16, the controller configured to execute instructions further comprising:
   determining, via a VGV schedule, a commanded high compressor loading, wherein the high compressor loading includes a VGV position.

18. The gas turbine engine of claim 16, the controller configured to execute instructions further comprising:
   receiving, via the high spool speed sensor, an actual high spool speed; and
   determining a commanded high spool speed based at least on the actual high spool speed.

* * * * *